United States Patent
Matsutani et al.

(10) Patent No.: US 9,282,170 B2
(45) Date of Patent: Mar. 8, 2016

(54) COMMUNICATION DEVICE AND METHOD FOR OPERATING COMMUNICATION DEVICE

(75) Inventors: Takashi Matsutani, Osaka (JP); Shigenori Motooka, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 530 days.

(21) Appl. No.: 13/809,295

(22) PCT Filed: Jun. 9, 2011

(86) PCT No.: PCT/JP2011/063263
§ 371 (c)(1),
(2), (4) Date: Jan. 9, 2013

(87) PCT Pub. No.: WO2012/008246
PCT Pub. Date: Jan. 19, 2012

(65) Prior Publication Data
US 2013/0124743 A1    May 16, 2013

(30) Foreign Application Priority Data
Jul. 15, 2010    (JP) ................ 2010-160442

(51) Int. Cl.
*G06F 15/16* (2006.01)
*H04L 29/06* (2006.01)
(Continued)

(52) U.S. Cl.
CPC ............. *H04L 69/03* (2013.01); *H04W 48/18* (2013.01); *H04W 88/06* (2013.01)

(58) Field of Classification Search
CPC ......... H04L 29/06; H04L 27/26; H04L 69/03; H04W 88/06; H04W 40/00

USPC ................. 709/230, 203, 227, 228; 370/338
See application file for complete search history.

(56) References Cited

U.S. PATENT DOCUMENTS

2006/0216778 A1    9/2006  Landry et al.
2007/0275746 A1*  11/2007  Bitran .......................... 455/509
(Continued)

FOREIGN PATENT DOCUMENTS

| CN | 101523974 A | 9/2009 |
|---|---|---|
| JP | 2009 278417 | 11/2009 |

(Continued)

OTHER PUBLICATIONS

Office Action issued Oct. 22, 2013 in Japanese Patent Application No. 2010-160442 (with partial English language translation).
(Continued)

*Primary Examiner* — Frantz Jean
(74) *Attorney, Agent, or Firm* — Oblon, McClelland, Maier & Neustadt, L.L.P.

(57) ABSTRACT

A communication device includes: a first communication element configured to perform communication in a first communication scheme; a second communication element configured to perform communication in a second communication scheme different from the first communication scheme by using, as common hardware, at least part among hardware that implements the communication in the first communication scheme; a schedule management section that manages which of the first communication element and the second communication element is to be used; and a sequence control section that, in accordance with an instruction given from the schedule management section, sets the common hardware so as to enable the communication in the first communication scheme or the communication in the second communication scheme to be performed.

5 Claims, 7 Drawing Sheets

(51) Int. Cl.
*H04W 48/18* (2009.01)
*H04W 88/06* (2009.01)

(56) References Cited

U.S. PATENT DOCUMENTS

2008/0081663 A1   4/2008   Kasslin et al.
2011/0149930 A1*  6/2011   Sakai ........................... 370/338

FOREIGN PATENT DOCUMENTS

JP     2010 504677        2/2010
JP     2010 522448        7/2010
WO     WO 2008/078311 A2  7/2008

OTHER PUBLICATIONS

International Preliminary Report on Patentability with English Translation issued on Jan. 24, 2013 in PCT/JP2011/063263 filed on Jun. 9, 2011.

International Preliminary Report on Patentability with Written Opinion issued on Feb. 12, 2013 in PCT/JP2011/063263 filed on Jun. 9, 2011.

Combined Chinese Office Action and Search Report issued Dec. 22, 2014 in Patent Application No. 201180034869.2 (with English language translation).

International Search Report Issued Jul. 19, 2011 in PCT/JP11/63263 Filed Jun. 9, 2011.

* cited by examiner

F I G . 1
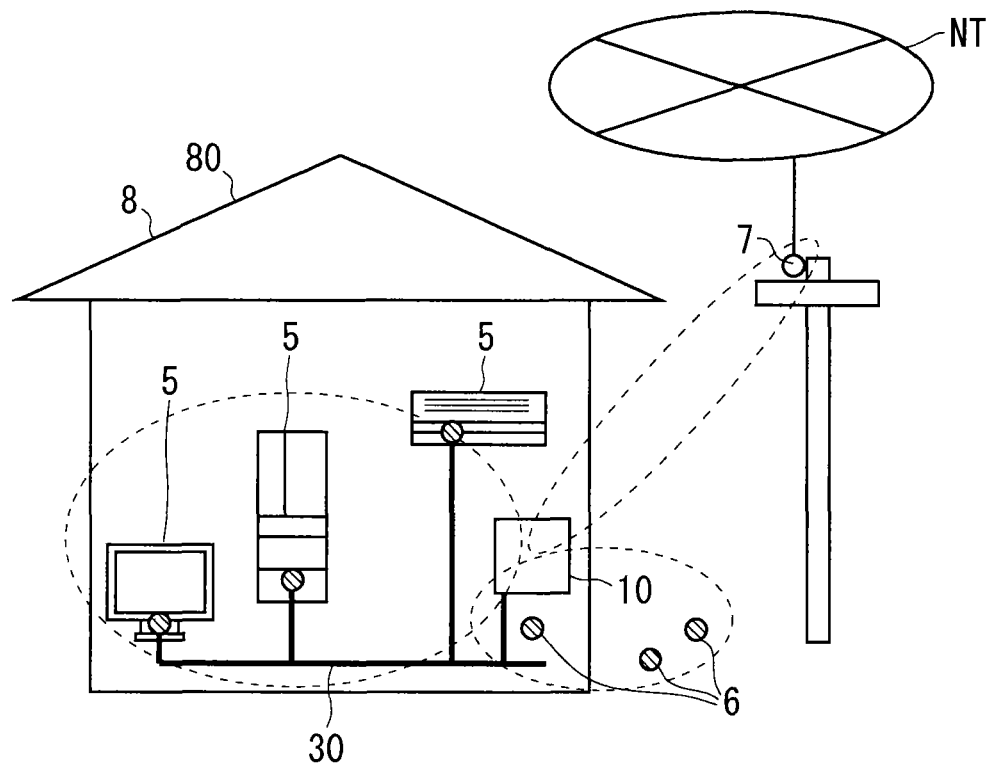

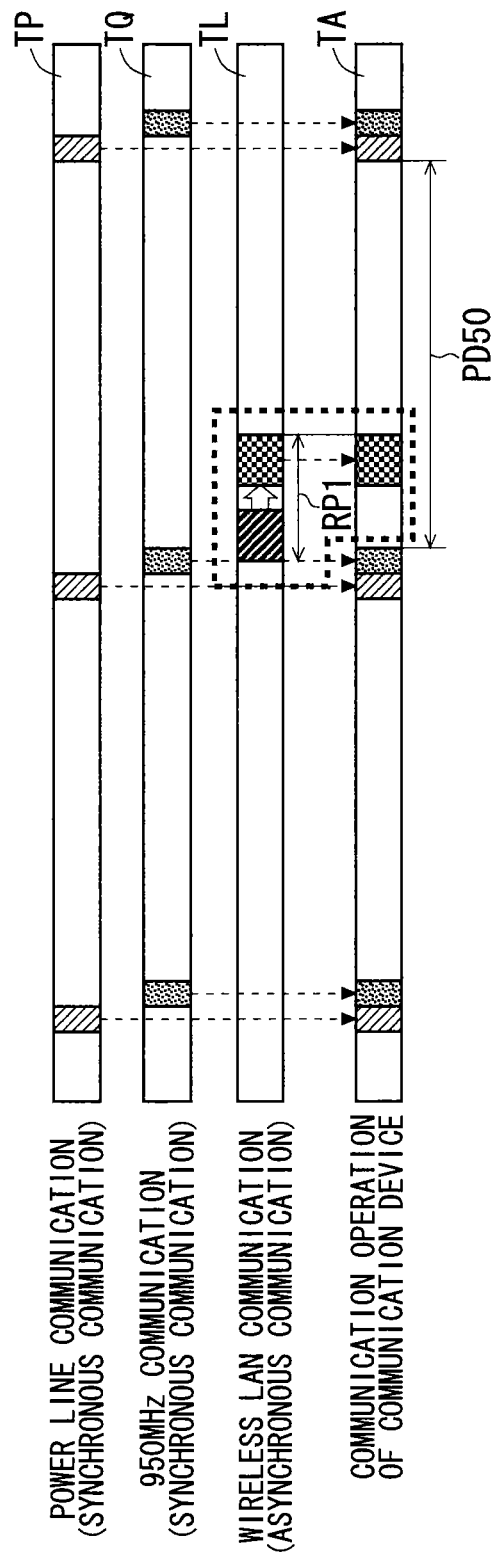

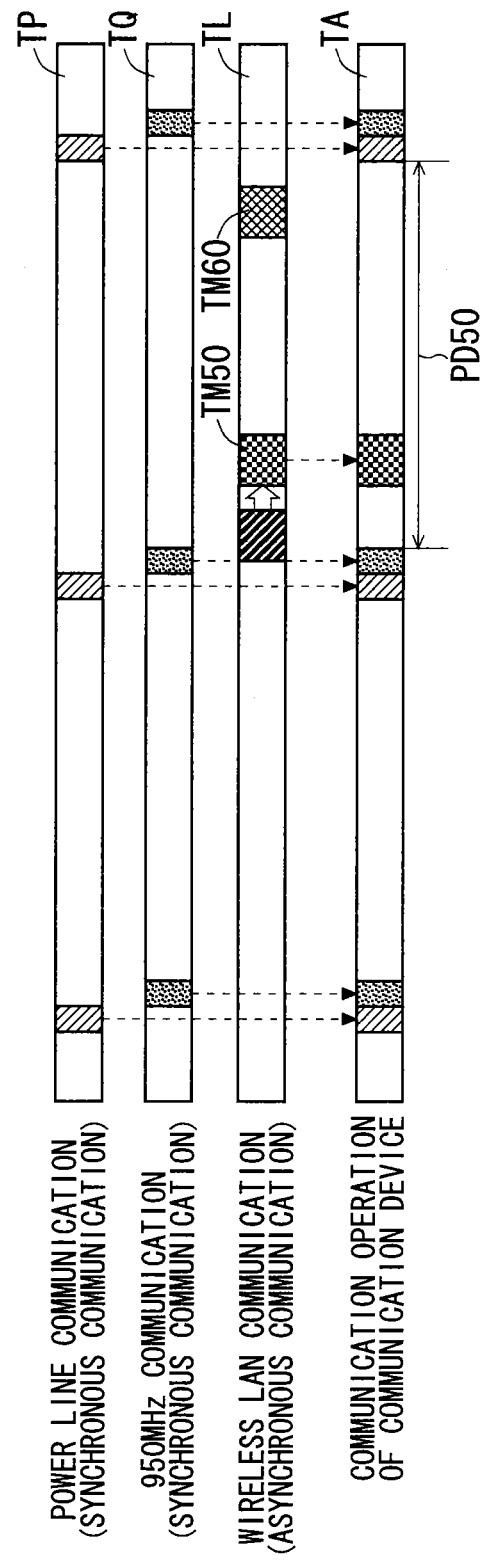

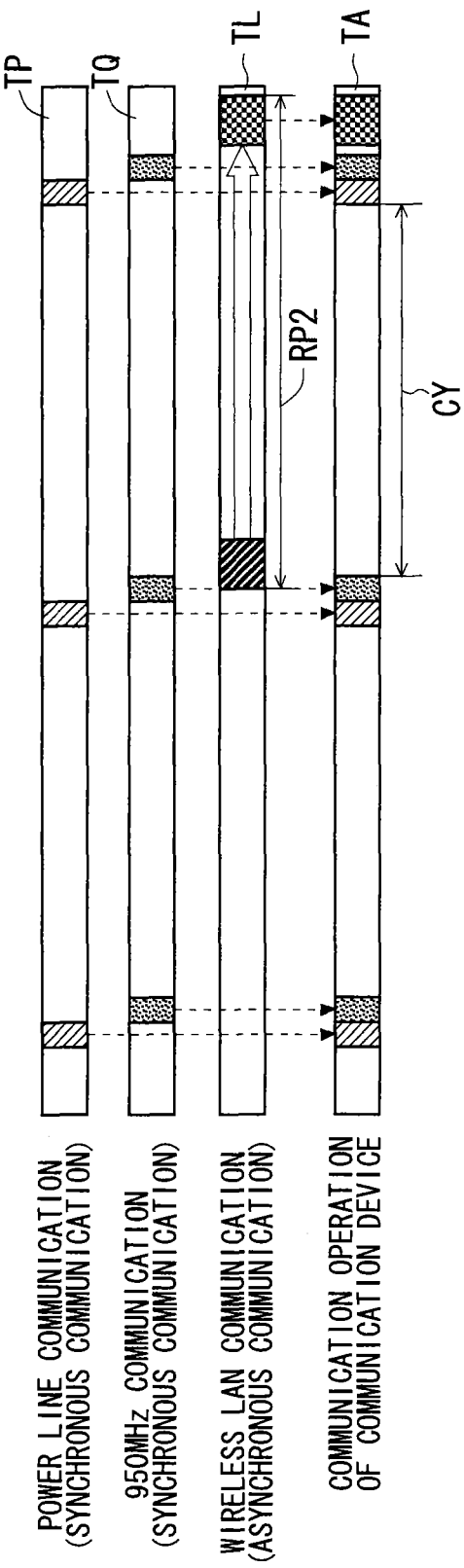

COMMUNICATION DEVICE AND METHOD FOR OPERATING COMMUNICATION DEVICE

TECHNICAL FIELD

The present invention relates to communication technologies.

BACKGROUND ART

Conventionally, there has been a communication system in which communication between devices or between apparatuses is performed by using different communication schemes.

For example, Patent Document 1 proposes a communication system in which information possessed by a communication device is transmitted to another communication device through wire communication and wireless communication.

PRIOR-ART DOCUMENTS

Patent Documents

Patent Document 1: Japanese Patent Application Laid-Open No. 2009-278417

SUMMARY OF THE INVENTION

Problems to be Solved by the Invention

Thus, in a communication device adapted for communication in different communication schemes, individual configurations each corresponding to each of the communication schemes are provided in order that communication can be performed in the respective communication schemes.

However, in such a communication device, the individual configuration is provided for each communication scheme. This increases the cost of the communication device.

Therefore, an object of the present invention is to provide a technique by which the cost of a communication device adapted for communication in different communication schemes can be reduced.

Means for Solving the Problems

To solve the above-described problem, a first aspect of a communication device includes: a first communication element configured to perform communication in a first communication scheme; a second communication element configured to perform communication in a second communication scheme different from the first communication scheme by using, as common hardware, at least part among hardware that implements the communication in the first communication scheme; a selection element for selecting which of the first communication element and the second communication element is to be used; and a setting control element for, in accordance with an instruction given from the selection element, setting the common hardware so as to enable the communication in the first communication scheme or the communication in the second communication scheme to be performed.

A second aspect of the communication device according to the first aspect mentioned above, in which: the selection element selects the first communication element at a predetermined timing that is in accordance with a communication protocol; and the selection element selects the second communication element at a timing other than the predetermined timing.

A third aspect of the communication device according to the present invention is the second aspect mentioned above, in which the communication in the first communication scheme is synchronous communication that is performed at the predetermined timing in accordance with the communication protocol.

A fourth aspect of the communication device according to the present invention is the second or third aspect mentioned above, in which the communication protocol is included in a protocol that defines rules for communication in a smart grid.

A method of operating a communication device according to the present invention is a method of operating a communication device including a first communication element and a second communication element, the first communication element being configured to perform communication in a first communication scheme, the second communication element being configured to perform communication in a second communication scheme different from the first communication scheme by using, as common hardware, at least part among hardware that implements the communication in the first communication scheme, the method including the steps of: a) selecting which of the first communication element and the second communication element is to be used; and b) in accordance with the selection made in the step a), setting the common hardware so as to enable the communication in the first communication scheme or the communication in the second communication scheme to be performed.

Effects of the Invention

The present invention can reduce the cost of a communication device adapted for communication in different communication schemes.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 A diagram showing a configuration of a communication system.

FIG. 5 A diagram showing a communication state of the communication device in chronological order.

FIG. 6 A diagram showing a communication state of the communication device in chronological order.

FIG. 7 A diagram showing a communication state of the communication device in chronological order.

EMBODIMENT FOR CARRYING OUT THE INVENTION

Figure 2:
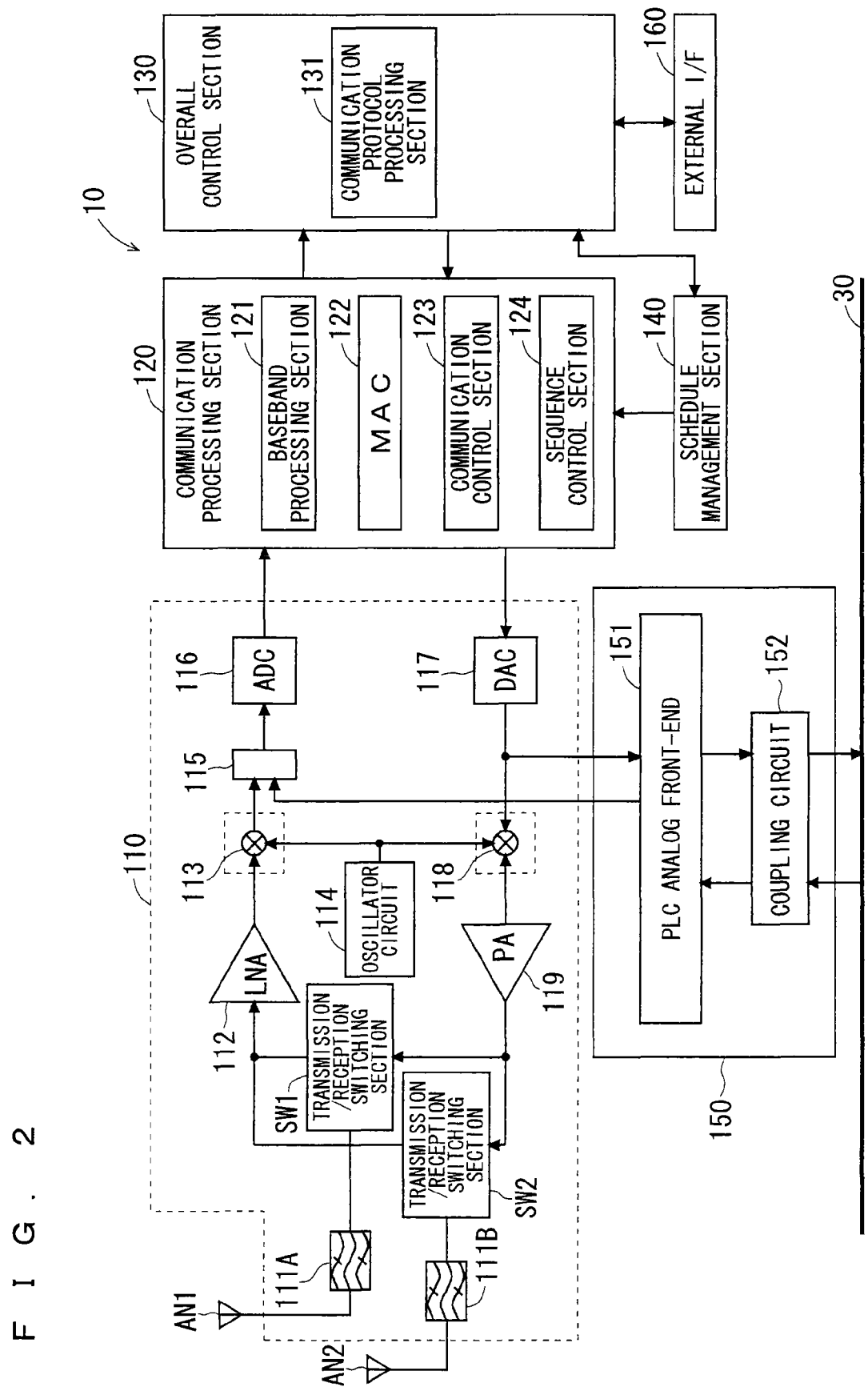
FIG. 2 A block diagram showing a functional configuration of a communication device.

Hereinafter, an embodiment of the present invention will be described with reference to the drawings.

Embodiment

1. Outline of Configuration

FIG. 1 is a diagram showing a configuration of a communication system 1 according to an embodiment.

As shown in FIG. 1, the communication system 1 includes a communication device 10, a relay device 7 connected to a communication network NT such as Internet, electrical appliances for household use (household electrical appliances) 5 existing in a home 80 as a facility 8, and sensors 6 placed inside or outside.

The communication device 10 has a function adapted for communication with the relay device 7, the household electrical appliances 5, and the sensors 6 in different communication schemes, respectively. To be specific, the communication device 10 is configured to communicate with the household electrical appliances 5 through power line communication (PLC: power line communication) that adopts a power line 30 as a communication medium. The communication device 10 is configured to communicate with the relay device 7 through wireless communication (also referred to as "wireless LAN communication") based on the IEEE 802.11 standard, and configured to communicate with the sensors 6 through wireless communication based on the IEEE 802.15.4g standard. In the wireless LAN communication, for example, communication is performed by using a radio signal having a frequency band with the center frequency at 2.5 GHz. In the wireless communication based on the IEEE 802.15.4g standard, communication is performed by using a radio signal having a frequency band with the center frequency at 950 MHz.

In this Description, the wireless LAN communication is also referred to as "communication in a first communication scheme", and the wireless communication (950 MHz communication) based on the IEEE 802.15.4g standard is also referred to as "communication in a second communication scheme". The power line communication (PLC) is also referred to as "communication in a third communication scheme".

The sensors 6 include a temperature sensor, a humidity sensor, a gas meter for measuring the amount of gas used, and the like. The communication device 10 is able to obtain environmental information from the sensors 6 through wireless communication using a frequency band of 950 MHz.

The household electrical appliances 5 include a TV, a refrigerator, an air conditioner, and the like. The communication device 10 also has a function for transmitting control information to the respective household electrical appliances 5 through the power line communication to thereby control the household electrical appliances 5. The control information may be information the communication device 10 sets based on the environmental information.

In a case illustrated in FIG. 1, the connection to the communication network NT is achieved by communication with the relay device 7 provided on a utility power pole. Instead, the connection to the communication network NT may be achieved by, for example, communication between the communication device 10 and a router at home, which is used as a relay device.

In this manner, the communication device 10 performs communication within a facility (indoor communication) or communication outside a facility (outdoor communication) with various electronic apparatuses by using a plurality of different communication schemes.

The communication device 10 may have a function as an electricity meter (power meter) for measuring the amount of power consumed in the home 80. In a case illustrated in this embodiment, the communication device 10 is used as a component part of a communication network in a smart grid that is a next-generation power grid.

2. Function Block of Communication Device 10

Next, functions of the communication device 10 included in the communication system 1 will be described. FIG. 2 is a block diagram showing a functional configuration of the communication device 10.

As shown in FIG. 2, the communication device 10 includes a communication section 110 connected to antenna elements AN1 and AN2, a communication processing section 120, an overall control section 130, a schedule management section 140, a PLC modem 150, and an external I/F 160 for the connection with an external apparatus (for example, an external storage).

The communication section 110 cooperates with each of the antenna elements AN1 and AN2, to perform wireless communication with a communication device (external communication device) provided outside. More specifically, the communication section 110 receives data via the antenna elements AN1 and AN2 from the external communication device, and outputs the received data to the communication processing section 120. The communication section 110 wirelessly transmits a signal (transmission signal) containing transmission data that is received from the communication processing section 120, to the external communication device via the antenna elements AN1 and AN2.

The communication section 110 is configured as communication means adapted for wireless communication with various external communication devices in two different communication schemes by cooperating with the communication processing section 120, which will be described later. In more detail, the communication section 110 includes a band-pass filter 111A connected to the antenna element AN1, a transmission/reception switching section SW1 connected to the band-pass filter 111A, a band-pass filter 111B connected to the antenna element AN2, and a transmission/reception switching section SW2 connected to the band-pass filter 111B.

For example, in a case of performing the communication in the first communication scheme (wireless LAN communication), the communication section 110 transmits and receives radio signals by using the antenna element AN1, the band-pass filter 111A, and the transmission/reception switching section SW1. In a case of performing the communication (950 MHz communication) in the second communication scheme different from the first communication scheme, the communication section 110 transmits and receives radio signals by using the antenna element AN2, the band-pass filter 111B, and the transmission/reception switching section SW2.

Here, a process in the communication section 110 performed in the wireless communication in the first communication scheme will be described. The description will be given separately for a reception process and a transmission process.

In the reception process, the band-pass filter 111A extracts a reception signal that is a processing object in the first communication scheme, from signals received by the antenna element AN1, and then outputs the extracted signal. The reception signal outputted from the band-pass filter 111A is inputted to a low noise amplifier (LNA: Low Noise Amplifier) 112 via the transmission/reception switching section SW1.

The low noise amplifier 112 amplifies the inputted reception signal, and outputs the amplified signal. The reception signal outputted from the low noise amplifier 112 is inputted to a mixer 113.

The mixer 113 multiplies the reception signal by a reference signal having a predetermined frequency that is outputted from an oscillator circuit 114, and converts the frequency band of the reception signal into a lower frequency band (here, a baseband). The baseband reception signal outputted from the mixer 113 is inputted to an A/D conversion circuit 116 via a selector 115.

The A/D conversion circuit 116 converts the inputted reception signal in analog form into a reception signal in digital form, and outputs the reception signal in digital form to the communication processing section 120.

In the transmission process, a D/A conversion circuit 117 converts a transmission signal received from the communication processing section 120, from a transmission signal in digital form into a transmission signal in analog. The transmission signal in analog form outputted from the D/A conversion circuit 117 is inputted to the mixer 118.

The mixer 118 multiplies the transmission signal by a reference signal outputted from the oscillator circuit 114, and converts the frequency band of the transmission signal into a higher frequency band (here, a carrier band). The carrier-band transmission signal outputted from the mixer 118 is inputted to a power amplifier (PA) 119.

The power amplifier 119 amplifies the inputted transmission signal, and outputs the amplified signal. The transmission signal outputted from the power amplifier 119 is inputted to the band-pass filter 111A via the transmission/reception switching section SW1.

The band-pass filter 111A performs a predetermined filtering process on the inputted transmission signal, to thereby eliminate an unnecessary signal from the transmission signal. The transmission signal outputted from the band-pass filter 111A is outputted as a radio signal via the antenna element AN1.

In this manner, to perform the wireless communication in the first communication scheme, the antenna element AN1, the band-pass filter 111A, and the transmission/reception switching section SW1 are used for the transmission and reception of radio signals.

On the other hand, in a case of performing the wireless communication in the second communication scheme different from the first communication scheme, the antenna element AN2, the band-pass filter 111B, and the transmission/reception switching section SW2 are used for the transmission and reception of radio signals.

The transmission/reception switching section SW2 is connected to the low noise amplifier 112, and a reception signal is outputted to the communication processing section 120 through the low noise amplifier 112, the mixer 113, the selector 115, and the A/D conversion circuit 116. The transmission/reception switching section SW2 is also connected to the power amplifier 119, and a transmission signal that the communication section 110 receives from the communication processing section 120 is, through the D/A conversion circuit 117, the mixer 118, and the power amplifier 119, inputted to the transmission/reception switching section SW2.

Thus, in the communication section 110, a set of a band-pass filter and a transmission/reception switching section is provided with respect to each of the first communication scheme and the second communication scheme. The other processes in the communication section 110 are performed by using common hardware resources provided in the communication section 110.

Also, in a case of performing the communication (power line communication) in the third communication scheme by using the PLC modem 150 which will be described later, the communication section 110 offers part (more specifically, the A/D conversion circuit 116 and the D/A conversion circuit 117) of the hardware resources provided in the communication section 110. Therefore, it can be also said that the communication section 110 cooperates with the communication processing section 120 and the PLC modem 150 to function as communication means adapted for the communication in the third communication scheme.

Next, the communication processing section 120 will be described. The communication processing section 120 is configured as a DSP (Digital Signal Processor), for example. The DSP reads out a program that is stored in a storage section (not shown) attached to the DSP, and executes the program, thereby implementing various function sections.

To be specific, the communication processing section 120 functionally implements a baseband processing section 121, a MAC (Media Access Control; media access control layer) 122, a communication control section 123, and a sequence control section 124.

The baseband processing section 121 performs a baseband process. In more detail, the baseband processing section 121 performs a process of converting a baseband reception signal into a signal suitable for analysis, and a process of converting the transmission data received from the overall control section 130 into a signal suitable for wireless transmission.

The MAC 122 performs an access control process that corresponds to a MAC layer in a hierarchical structure of data communication. For example, the MAC 122 eliminates additional information from the baseband reception signal received from the communication section 110 and outputs the reception signal obtained as a result of the elimination to the baseband processing section 121. Also, the MAC 122 adds predetermined information to the transmission signal received from the baseband processing section 121, and outputs the transmission signal obtained as a result of the addition of the information to the communication section 110.

The communication control section 123 controls a communication operation performed by the communication section 110. More specifically, the communication control section 123 controls the transmission/reception switching sections SW1 and SW2, the oscillator circuit 114, and the selector 115, to control the communication operation in accordance with the communication scheme.

The sequence control section 124 causes the communication processing section 120 to operate in the communication scheme that is in accordance with an instruction given from the schedule management section 140 which will be described later. More specifically, in order to enable communication to be performed in the communication scheme that is in accordance with the instruction given from the schedule management section 140, the sequence control section 124 functionally implements the baseband processing section 121, the MAC 122, and the communication control section 123 corresponding to this communication scheme. That is, the baseband processing section 121, the MAC 122, and the communication control section 123 described above are implemented through execution of a program selected by the sequence control section 124.

For example, in a case where an instruction to perform the communication in the first communication scheme is received from the schedule management section 140, the sequence control section 124 reads out a program for implementing the communication in the first communication scheme from the storage section. Then, the sequence control section 124 executes the program in the DSP, thereby causing the communication processing section 120 to operate so as to enable the communication in the first communication scheme.

As a result, the baseband processing section 121, the MAC 122, and the communication control section 123 corresponding to the first communication scheme are functionally implemented in the communication processing section 120. That is, the baseband processing section 121 and the MAC 122 that are implemented in accordance with the first communication scheme perform a baseband process and a MAC process, respectively, corresponding to the first communication scheme. The communication control section 123 that is implemented in accordance with the first communication scheme switches the transmission/reception switching section SW1 in response to the transmission process and the reception process, and also controls the oscillator circuit 114 so as to generate the reference signal having a frequency corresponding to the first communication scheme. The communication control section 123 also controls the selector 115 such that the reception signal received from the mixer 113 is outputted to the A/D conversion circuit 116.

In this manner, the sequence control section 124 functions as setting control means for, in response to the instruction given from the schedule management section 140, automatically setting the communication device 10 so as to enable communication in the communication scheme that is in accordance with this instruction.

The overall control section 130 is configured as a micro computer, and mainly includes a CPU, a RAM, a ROM (all of which are not shown), and the like. The overall control section 130 reads out a program that is stored in the ROM, and executes the program in the CPU, thereby functionally implementing a communication protocol processing section 131.

The communication protocol processing section 131 performs a process that is in accordance with a communication protocol, in order to cause the communication device to perform the communication operation that is in accordance with the communication protocol. For example, the communication protocol processing section 131 sets the schedule management section 140 so as to perform a schedule management that is in accordance with the communication protocol. The setting of the schedule management section 140 configured by the communication protocol processing section 131 occurs at a time when the communication device 10 is started.

The schedule management section 140 performs a schedule management of the communication operation that is performed in the communication device 10. To be specific, after the communication protocol processing section 131 configures initial setting of the schedule management section 140, the schedule management section 140 performs the schedule management that is in accordance with the communication protocol, and outputs a communication operation instruction to the sequence control section 124 of the communication processing section 120.

In more detail, this communication protocol includes rules for performing communication (synchronous communication) in synchronization with another communication device at a predetermined timing that is defined in advance. Based on the rules, at a predetermined timing, the schedule management section 140 outputs, to the sequence control section 124, an operation instruction instructing that the synchronous communication be performed.

The illustration in this embodiment assumes that the communication in the second communication scheme and the communication in the third communication scheme are performed in synchronization with another communication device. That is, when the timing for performing the communication in the second communication scheme comes, the schedule management section 140 outputs, to the sequence control section 124, the operation instruction instructing that the communication in the second communication scheme be performed, so that the communication device 10 performs the communication operation in the second communication scheme. When the timing for performing the communication in the third communication scheme comes, the schedule management section 140 outputs, to the sequence control section 124, the operation instruction instructing that the communication in the third communication scheme be performed, so that the communication device 10 performs the communication operation in the third communication scheme.

The synchronous communication is communication in which data is transmitted while the transmitter side and the receiver side are synchronizing with each other. Examples of the synchronous communication performed at a predetermined timing include periodic communication. The communication protocol including the rules for performing such synchronous communication is included in a protocol that defines the rules of communication in the smart grid.

Additionally, at a timing other than the timing for performing the synchronous communication, the schedule management section 140 performs a schedule management so as to perform asynchronous communication. The illustration in this embodiment assumes that the communication in the first communication scheme is asynchronous communication.

In this manner, the schedule management section 140 has a function as selection means for automatically selecting which one of the plurality of communication schemes is to be used for performing communication.

The PLC modem 150 is configured with a PLC analog front-end 151 including an analog amplifier and the like, and a coupling circuit 152 to be coupled to the power line 30. The PLC modem 150 has a function for generating a PLC signal based on the transmission signal received from the communication processing section 120 through the D/A conversion circuit 117, and then superimposing the PLC signal on the power line 30.

The PLC modem 150 also has a function for demodulating the received PLC signal, obtaining a reception signal, and outputting the reception signal to the communication section 110. In this manner, the PLC modem 150 implements power line communication by using the power line 30 as a communication medium.

3. Communication Operation of Communication Device 10

Figure 3:
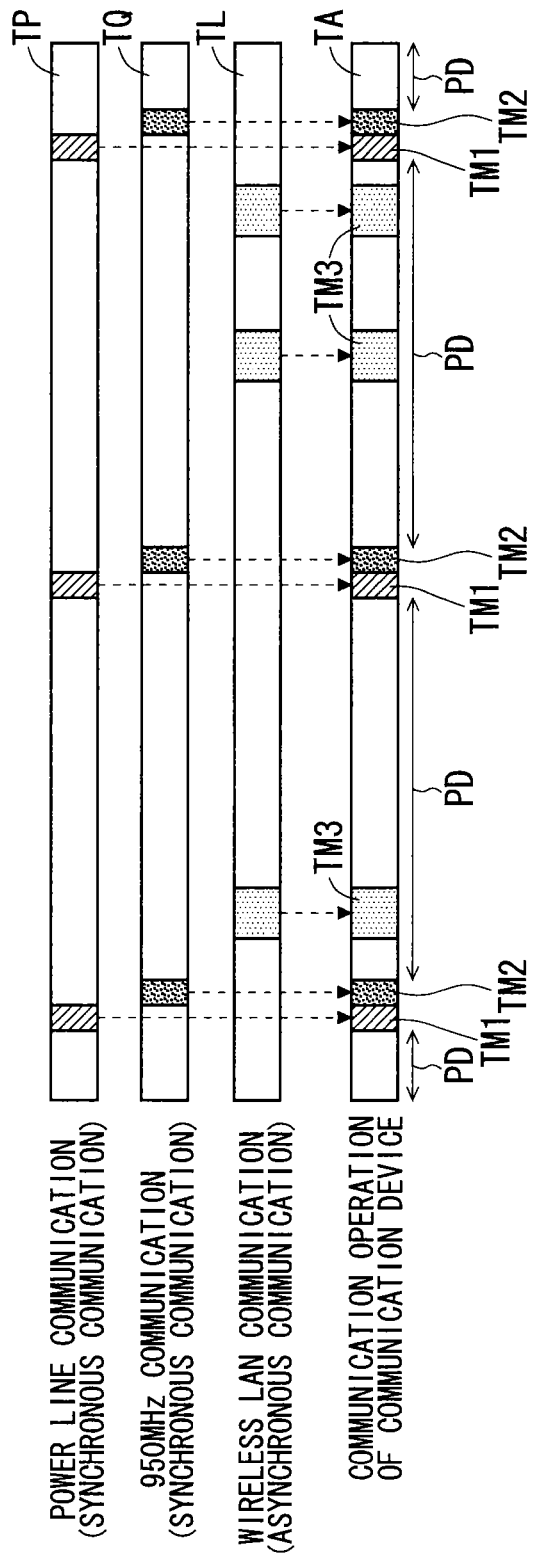
FIG. 3 A diagram showing a communication state of the communication device in chronological order.

Next, a communication operation of the communication device 10 will be described. FIG. 3 is a diagram showing a communication state of the communication device 10 in chronological order. FIG. 3 shows a communication timing TP of the power line communication, a communication timing TQ of the 950 MHz communication, a communication timing TL of the wireless LAN communication, a communication timing TA of the communication device 10 in which the communication timings of the power line communication, the 950 MHz communication, and the wireless LAN communication are also indicated.

As shown in FIG. 3, in the communication device 10, the power line communication is performed at a timing TM1 that comes with a predetermined period while the 950 MHz communication is performed at a timing TM2 that comes with a predetermined period and that is different from the timing of the power line communication.

The timings TM1 and TM2 for performing the power line communication and the 950 MHz communication, respectively, are managed by the schedule management section 140. Each time the timing TM1 or TM2 comes, the schedule management section 140 outputs, to the sequence control section 124, the communication operation instruction corresponding to the timing TM1 or TM2, respectively.

Upon reception of the operation instruction, the sequence control section 124 causes the communication processing section 120 to operate in the communication scheme in accordance with this operation instruction. Thereby, the communication device 10 is set so as to enable desired communication to be performed at the timings TM1 or TM2.

As described above, in the communication device 10, the power line communication and the 950 MHz communication that are the synchronous communication are performed with predetermined periods and at different timings.

In the communication device 10, the wireless LAN communication is performed at an arbitrary timing TM3 that is different from the timings TM1 and TM2 for performing the synchronous communication.

More specifically, when the timing TM1 or TM2 for performing the synchronous communication is terminated, the schedule management section 140 outputs, to the sequence control section 124, a setting change instruction for performing the asynchronous communication (wireless LAN communication). Upon reception of the setting change instruction, the sequence control section 124 causes the communication processing section 120 to operate so as to enable the wireless LAN communication. In more detail, the sequence control section 124 reads out a program for implementing the wireless LAN communication from the storage section, and executes the program, thereby causing the communication processing section 120 to operate so as to enable the wireless LAN communication. Thus, the communication device 10 is set so as to enable the wireless LAN communication. For example, in FIG. 3, a time period PD indicated by a double-headed arrow is a time period in which the setting that enables the wireless LAN communication is configured.

The communication device 10 set so as to enable the wireless LAN communication is in a state where a transmission signal is receivable from another communication device that is performing the wireless LAN communication. At the timing TM3 of reception of this transmission signal, the wireless LAN communication is performed.

In this manner, during a time period (synchronous communication unexecuting period) in which the synchronous communication is not performed, the communication device 10 is set so as to perform the asynchronous communication. The synchronous communication unexecuting period is also referred to as an asynchronous communication executable period.

In a case where another communication device that is performing the wireless LAN communication outputs a transmission signal during a time period (synchronous communication executing period) in which the synchronous communication is performed, the communication device 10 cannot receive the transmission signal and cannot perform the asynchronous communication. However, when another communication device that is performing the wireless LAN communication has a function for re-transmitting transmission data in a case where the transmission data cannot be transmitted to a partner device, the communication device 10 can perform the asynchronous communication in the synchronous communication unexecuting period and can obtain the transmission data that has been re-transmitted.

Figure 4:
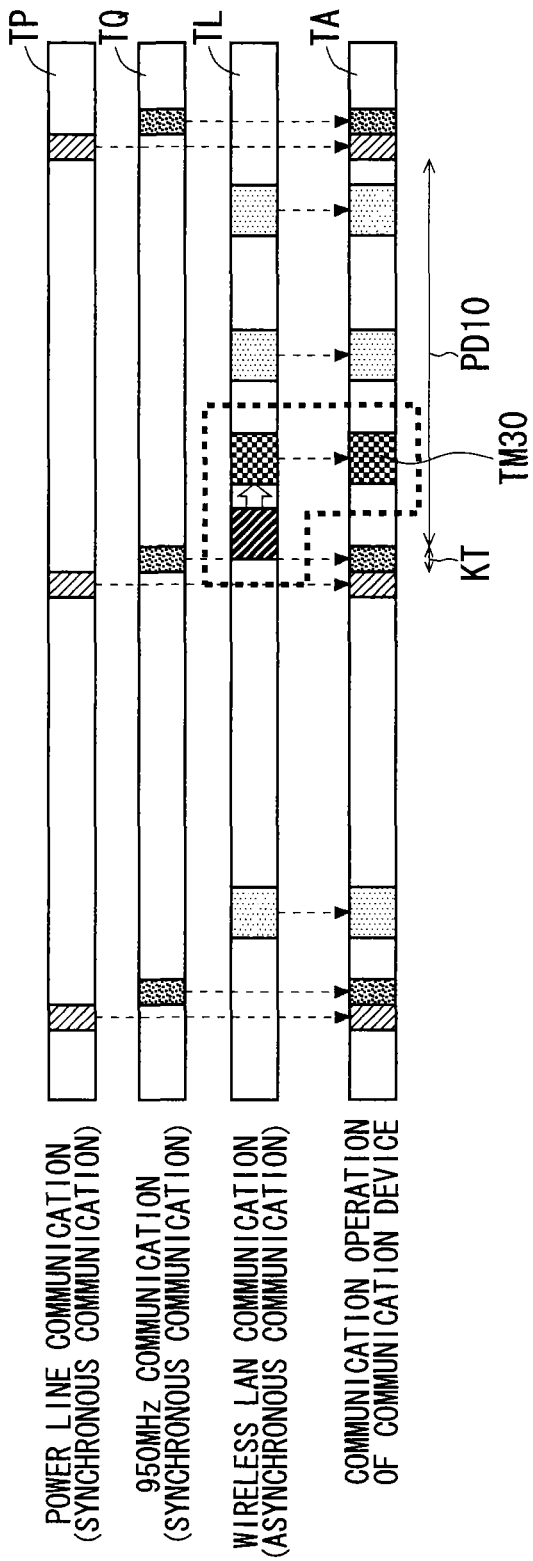
FIG. 4 A diagram showing a communication operation of the communication device in a case where a transmission signal is outputted from another communication device that performs wireless LAN communication during a period in which 950 MHz communication is performed.

For example, FIG. 4 shows a communication operation of the communication device 10 in a case where another communication device that is performing the wireless LAN communication outputs a transmission signal during a period KT in which the 950 MHz communication that is the synchronous communication is performed. In this case, another communication device re-transmits the transmission data at a timing TM30 within a synchronous communication unexecuting period PD10 coming after the synchronous communication executing period KT is terminated. Thus, the asynchronous communication (wireless LAN communication) between the communication device 10 and another communication device is performed.

As described above, in the communication device 10, hardware (in detail, the communication section 110 and the communication processing section 120) that implements the synchronous communication and hardware (the communication section 110 and the communication processing section 120) that implements the asynchronous communication are configured to share at least part of hardware. To perform the synchronous communication, setting for enabling the synchronous communication is configured on the shared hardware. To perform the asynchronous communication, setting for enabling the asynchronous communication is configured on the shared hardware. Thus, the communication device 10 performs the synchronous communication and the asynchronous communication by using the shared hardware at different times, in other words, by time-sharing the shared hardware as common hardware.

In this communication device 10, it is not necessary to individually provide all the configurations for performing the synchronous communication and the asynchronous communication. Thus, the cost of the communication device 10 can be reduced. Additionally, the sharing of the hardware can reduce the size of the communication device 10 and also can reduce the overhead.

In a case where a communication device (also referred to as "partner communication device") that is a partner performing the asynchronous communication has the function for re-transmitting transmission data, the asynchronous communication performed by the communication device 10 can be achievable particularly in the following cases (1) to (3). FIGS. 5 to 7 are diagrams showing communication states of the communication device 10 in chronological order. FIG. 5 shows a communication state in the case (1). FIG. 6 shows a communication state in the case (2). FIG. 7 shows a communication state in the case (3).

(1) A case where the synchronous communication unexecuting period in the communication device 10 is longer than a time period required for the re-transmission of transmission data in the partner communication device.

More specifically, a shown in FIG. 5 for example, in a case where a synchronous communication unexecuting period PD50 in the communication device 10 is longer than a time interval from initial transmission to re-transmission of transmission data in the partner communication device, that is, a time period RP1 required for the re-transmission of the transmission data in the partner communication device, there is a high likelihood that the communication device 10 obtains the transmission data that has been re-transmitted. Thus, the asynchronous communication is particularly achievable.

(2) A case where a timing when the partner communication device re-transmits transmission data is at random, and it is likely that the re-transmission of transmission data is performed during the synchronous communication unexecuting period of the communication device 10.

More specifically, as shown in FIG. 6 for example, if the partner communication device re-transmits transmission data at a random timing such as the timing TM50 or the timing TM60, there is a high likelihood that transmission data is re-transmitted during the synchronous communication unexecuting period PD50 of the communication device 10. Thus, the asynchronous communication is particularly achievable.

(3) A case where an interval from initial transmission to re-transmission of transmission data in the partner communication device is different from the period of the synchronous communication of the communication device 10.

More specifically, as shown in FIG. 7 for example, an interval RP2 from initial transmission to re-transmission of transmission data in the partner communication device is different from a period CY of the synchronous communication of the communication device 10, it is guaranteed that the partner communication device re-transmits transmission data during the synchronous communication unexecuting period of the communication device 10. Thus, the asynchronous communication is particularly achievable.

Modification

Although an embodiment of the invention has been described above, the invention is not limited to the above-described one.

For example, although, in the embodiment described above, the communication processing section 120 is configured with the DSP, this it not limiting. To be specific, the function sections implemented in the communication processing section 120 may be partially or wholly configured as hardware. More specifically, for example, it may be acceptable that a common part in each communication scheme is configured as predetermined hardware while setting of parameters of the hardware, switching of a path, an operation procedure, and the like, are controlled by means of a programmable logic controller (PLC: Programmable Logic Controller). This achieves a hardware configuration specialized in the function of the communication processing section, and therefore can reduce the overhead as compared with the use of the DSP.

Additionally, although, in the embodiment described above, the schedule management section 140 is configured as an element independent of the communication processing section 120 and the overall control section 130, this is not limiting. It may be acceptable that the overall control section 130 functionally implements the schedule management section.

Moreover, although, in the embodiment described above, the communication device 10 is set so as to enable the asynchronous communication to be performed throughout the synchronous communication unexecuting period, this is not limiting. It may be acceptable that the communication device 10 is set so as to enable the asynchronous communication to be performed in part of the synchronous communication unexecuting period.

Furthermore, although, in the embodiment described above, communications in two different communication schemes (that is, the power line communication and the 950 MHz communication) is performed as the synchronous communication, this is not limiting. It may be acceptable that only communication in one communication scheme (for example, the power line communication) is performed as the synchronous communication, or alternatively it may be acceptable that communications in three or more different communication schemes are performed as the synchronous communication.

While the invention has been described in detail, the foregoing description is in all aspects illustrative and not restrictive. It is therefore understood that numerous modifications and variations not illustrated herein can be devised without departing from the scope of the invention.

DESCRIPTION OF THE REFERENCE NUMERALS 1 communication system
5 household electrical appliance
6 sensor
7 relay device
8 facility
10 communication device
30 power line
80 home
110 communication section
120 communication processing section
130 overall control section
140 schedule management section
150 PLC modem
NT communication network

The invention claimed is:

1. A communication device comprising:
first communication circuitry configured to perform communication in a first communication scheme in which power line communication is performed, the power line communication adopting a power line communication medium;
second communication circuitry configured to perform communication in a second communication scheme performing wireless communication by using, as common hardware, at least part of hardware that implements the communication in said first communication scheme;
selection circuitry configured to select which of said first communication circuitry and said second communication circuitry is to be used; and
setting control circuitry configured to, in accordance with an instruction given from said selection circuitry, set said common hardware so as to enable the communication in said first communication scheme or the communication in said second communication scheme to be performed,
wherein said common hardware includes:
a selector that selects and outputs either one of a baseband reception signal generated in said second communication scheme or a reception signal obtained by a PLC modem included in said first communication scheme, and
an A/D conversion circuit that converts a signal output from said selector in analog form into a signal in digital form, and
wherein said setting control circuitry controls said selector in accordance with the instruction given from said selection circuitry.

2. The communication device according to claim 1, wherein
said selection circuitry selects said first communication circuitry at a predetermined timing that is in accordance with a communication protocol, and
said selection circuitry selects said second communication circuitry at a timing other than said predetermined timing.

3. The communication device according to claim 2, wherein the communication in said first communication scheme is synchronous communication that is performed at said predetermined timing in accordance with said communication protocol.

4. The communication device according to claim 2, wherein
said communication protocol is included in a protocol that defines rules for communication in a smart grid.

5. A method of operating a communication device including a first communication element and a second communication element, said first communication element being configured to perform communication in a first communication scheme in which power line communication is performed, the power line communication adopting a power line as a communication medium, said second communication element being configured to perform communication in a second communication scheme performing wireless communication by using, as common hardware, at least part of hardware that implements the communication in said first communication scheme, said method comprising:

a) selecting which of said first communication element and said second communication element is to be used; and
b) in accordance with the selection made in said a), setting said common hardware so as to enable the communication in said first communication scheme or the communication in said second communication scheme to be performed, wherein said common hardware includes:
a selector that selects and outputs either one of a baseband reception signal generated in said second communication scheme or a reception signal obtained by a PLC modem included in said first communication scheme, and
an A/D conversion circuit that converts a signal output from said selector in analog form into a signal in digital form, and wherein, in said b) said selector is controlled in accordance with the selection made in said a).

* * * * *